United States Patent [19]

Thiruvillakkat

[11] 4,178,328
[45] Dec. 11, 1979

[54] RIGID, HIGH IMPACT POLYPROPYLENE COMPOSITIONS

[75] Inventor: Krishnan Thiruvillakkat, Parkersburg, W. Va.

[73] Assignee: Borg-Warner Corporation, Chicago, Ill.

[21] Appl. No.: 860,349

[22] Filed: Dec. 14, 1977

[51] Int. Cl.² .............................................. C08L 53/02
[52] U.S. Cl. ...................................................... 525/98
[58] Field of Search .................................... 260/876 B

[56] References Cited

U.S. PATENT DOCUMENTS

| | | | |
|---|---|---|---|
| 3,299,174 | 1/1967 | Kuhre et al. | 260/876 B |
| 3,576,913 | 4/1971 | Johnson et al. | 260/876 B |

*Primary Examiner*—J. Ziegler
*Attorney, Agent, or Firm*—Richard J. Schlott

[57] ABSTRACT

Polypropylene compositions comprising a polypropylene polymer and a hydrogenated block polymer impact modifier exhibit enhanced impact properties and retain rigidity when blended with a crystalline polyethylene.

4 Claims, No Drawings

RIGID, HIGH IMPACT POLYPROPYLENE COMPOSITIONS

BACKGROUND OF THE INVENTION

This invention relates to improved polypropylene compositions having good impact strength and stiffness. More particularly, the invention relates to blends comprising polypropylene, a hydrogenated block polymer impact modifier and crystalline polyethylene which exhibit an unexpected improvement in impact properties while maintaining high rigidity and stiffness properties, and to a method for enhancing the efficiency and effectiveness of block polymer impact modifiers for polypropylene.

A shortcoming of polypropylene for structural parts has been its notch sensitivity and consequent low impact strength. A variety of rubbery compounds has been employed to improve the impact resistance of polypropylene, however these improvements are usually gained at the expense of other properties. For example, the use of hydrogenated block copolymers to impact modify polypropylene is disclosed in U.S. Pat. No. 3,299,174. Although improvement in impact properties results without imparting an undesirable level of stress whitening, the stiffness of the polypropylene compositions is significantly lowered, to the point of becoming rubbery in character at high levels of modifier. This loss of rigidity precludes the use of these compositions in many structural applications where a combination of high impact strength and stiffness is required.

A method for retaining stiffness and rigidity while improving the impact properties of polypropylene would thus extend the utility of impact-modified polypropylene compositions.

SUMMARY OF THE INVENTION

Compositions comprising polypropylene and a hydrogenated block polymer impact modifier exhibit substantially increased stiffness when compounded with polyethylene. More particularly, the addition of crystalline polyethylene to blends comprising polypropylene and a hydrogenated block copolymer impact modifier enhances the effectiveness of the impact modifier but the rigidity and stiffness of the blends as measured by flexural modulus is retained.

The polypropylenes useful in the compositions of this invention are widely available commercially and include the substantially crystalline propylene polymers and copolymers containing up to 20 mole percent comonomer units. These polymers are further described as having high molecular weight and exhibit a low melt flow, generally less than 15 g./10 min., and preferably from about 0.1 to 10 g./10 min. as measured by ASTM test method D-1238, condition L.

The hydrogenated rubber block copolymers useful as impact modifiers in polypropylene compositions may generally be described as having an A-B-A configuration wherein, prior to hydrogenation, polymeric blocks A comprise vinyl aromatic monomer units including styrene, alphamethylstyrene, vinyl toluene, vinyl napthalene and the like and polymeric blocks B comprise an elastomeric polymer of a conjugated diene monomer such as for example 1,3-butadiene, isoprene and the like. The A-B-A block polymers useful for the purposes of this invention are hydrogenated to substantially remove at least all ethylenic unsaturation, and may be hydrogenated to fully remove both ethylenic and aromatic unsaturation. Hydrogenated block polymer modifiers are fully described and methods for their preparation are set forth in U.S. Pat. No. 3,299,174.

The crystalline polyethylenes useful in the practice of this invention are polyethylenes having a density greater than 0.91, and a melt flow of less than about 50 g./10 min., preferably from about 0.01 to 10 g./10 min., measured as described above.

The amount of polypropylene will be from about 90 to about 50 percent by weight of the total composition, the amount of hydrogenated block polymer impact modifier will be from about 5 to about 25 percent by weight of the total composition, and the amount of polyethylene will be from about 5 to about 25 percent by weight of the total composition. Blends of the three components may be prepared by any of the conventional melt mixing processes including for example, Banbury mixing and milling of the composition or by compounding a dry blend of the components in a screw extruder.

The invention will be better understood by consideration of the following examples, which are provided by way of illustration of the invention and not in limitation thereof.

EXAMPLES 1-10

Polypropylene compositions were prepared by mixing the indicated parts by weight of the components, then charging the dry blend to a Banbury mixer, heated to 350° F. and mixed for 5 min.. The mass was dropped to a two roll mill at 350° F. and sheeted out, cooled and ground in a Wiley mill. The pellets were injection molded into test bars at 150° F. mold temperature and 1000 psi pressure. The ⅛"×½"×8" test bars were conditioned at 23° C. and 50 percent relative humidity for 24 hours prior to testing.

The polypropylene employed was obtained as Profax 6523 from Hercules, Inc., and had a melt flow of 4 g./10 min. (ASTM D-1238, cond. L) and a density of 0.902 g/cm³; the impact modifier was a hydrogenated styrene-butadiene-styrene block polymer, obtained as Kraton G-1650 from Shell Chemical Co., with a combined styrene block content of 28 wt. percent, the ethylenic unsaturation having been removed by hydrogenation. The polyethylene had a density of 0.96 g/cm³ and a melt flow of 0.2 g./10 min..

The compositions and test data are reported in Table I.

Table I

| Example No. | Polypropylene pbw | Modifier[1] pbw | Polyethylene pbw | Impact[2] ft lbs/in | Tensile[2] yield, psi | Flexural[2] Mod., psi |
|---|---|---|---|---|---|---|
| 1 | 100 | 0 | 0 | 0.4 | 5000 | 240,000 |
| 2 | 90 | 10 | 0 | 1.5 | 4100 | 180,000 |
| 3 | 80 | 20 | 0 | 11.0* | 3500 | 150,000 |
| 4 | 70 | 30 | 0 | 14.6* | 3000 | 130,000 |
| 5 | 90 | 5 | 5 | 1.4 | — | — |
| 6 | 80 | 10 | 10 | 7.0 | 4200 | 180,000 |

Table I-continued

| Example No. | Polypropylene pbw | Modifier[1] pbw | Polyethylene pbw | Impact[2] ft lbs/in | Tensile[2] yield, psi | Flexural[2] Mod., psi |
| --- | --- | --- | --- | --- | --- | --- |
| 7 | 70 | 15 | 15 | 16.2* | 3800 | 155,000 |
| 8 | 90 | 0 | 10 | 0.5 | — | — |
| 9 | 80 | 0 | 20 | 0.7 | 5000 | 220,000 |
| 10 | 70 | 0 | 30 | 0.7 | 4800 | 220,000 |

Notes:
[1]Modifier is Styrene-Butadiene-Styrene block polymer, hydrogenated to remove ethylenic unsaturation; see text.
[2]Tensile Yield, ASTM D-638C, 2"/min; Impact is Notched Izod Impact, ASTM D-256, ⅛" bars at 23° C., =
*denotes partial break; Flexural Modulus, ASTM D-747.

Polypropylene alone, Example 1, has low notched Izod impact properties. The addition of from 10 to 30 wt percent hydrogenated block polymer as an impact modifier results in improved impact performance, but the rigidity of the blends is markedly decreased (Examples 2-4). Surprisingly, small amounts of polyethylene sharply increase the effectiveness of the impact modifier, without decreasing the stiffness of the blends. (Examples 5-7). Thus, in Example 5, the addition of 5 parts of polyethylene results in a composition having an impact value comparable to that of the composition of Example 2, even though Example 5 employs only one-half the amount of impact modifier; the compositions of Examples 2 and 6 both contain 10 parts by weight of impact modifier and have essentially the same tensile and flexural properties, but the impact properties of Example 6 are improved nearly five-fold by the addition of 10 parts of polyethylene. Similarly, the composition of Example 3 contains 20 pbw impact modifier and has somewhat lower tensile properties than the composition of Example 7 containing 15 pbw impact modifier; the impact properties of Example 7 are significantly enhanced in comparison to those of Example 3 by the addition of 15 pbw polyethylene. Polyethylene alone has little or no effect on impact properties and rigidity of polypropylene, as shown in Examples 8-10.

The invention will thus be seen to be improved polypropylene compositions comprising from about 90 to about 50 percent by weight polypropylene, from 5 to 25 percent by weight hydrogenated block copolymer and from 5 to 25 wt percent by weight polyethylene, and a method for enhancing the impact properties of polypropylene compositions. It will be apparent to those skilled in the art that further modifications of the invention including the use of fillers, stabilizers, dyes, pigments, lubricants and the like will be possible without departing from the spirit and scope of the invention.

I claim:

1. A polymeric blend composition comprising from 80 to 60 wt. percent of a polypropylene polymer, from 10 to 20 wt. percent of a hydrogenated block copolymer having the general configuration A-B-A wherein prior to hydrogenation the A's are polymeric blocks of vinylaromatic monomer units and B is an elastomeric polymer block of a conjugated diene monomer, said copolymer being hydrogenated to remove the ethylenic unsaturation, and from 10 to 20 wt. percent polyethylene.

2. The composition of claim 1 wherein the polypropylene polymer is a substantially crystalline polymer having a melt flow of from about 0.1 to 10 g./10 min. as measured by ASTM test method D-1238, condition L.

3. The composition of claim 1 wherein the polyethylene is substantially crystalline, having a melt flow of from about 0.01 to 10 g./10 min. as measured by ASTM test method D-1238, condition L, and a density greater than 0.91 g./cm$^3$.

4. A method for improving the impact properties of polymeric blends comprising 80 to 60 wt. percent; polypropylene polymers and 10 to 20 wt. percent hydrogenated block copolymers having the general configuration A-B-A wherein the ethylenic unsaturation is removed by hydrogenation, comprising blending therewith from about 10 to about 20 percent by weight based on final composition of a crystalline polyethylene.

* * * * *